United States Patent
Huang et al.

(10) Patent No.: US 11,239,900 B2
(45) Date of Patent: Feb. 1, 2022

(54) INTERFERENCE CANCELLER AND METHOD FOR CANCELLING INTERFERENCE

(71) Applicant: REALTEK SEMICONDUCTOR CORPORATION, Hsinchu (TW)

(72) Inventors: Liang-Wei Huang, Hsinchu (TW); Chin-Chi Yang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/120,401

(22) Filed: Dec. 14, 2020

(65) Prior Publication Data
US 2021/0184757 A1 Jun. 17, 2021

(30) Foreign Application Priority Data
Dec. 16, 2019 (TW) ................. 108145918

(51) Int. Cl.
*H04B 7/155* (2006.01)
*H04B 1/7105* (2011.01)

(52) U.S. Cl.
CPC ....... *H04B 7/15585* (2013.01); *H04B 1/7105* (2013.01)

(58) Field of Classification Search
CPC .... H04B 7/15585; H04B 1/7105; H04B 3/04; H04B 3/32
See application file for complete search history.

(56) References Cited

U.S. PATENT DOCUMENTS 6,374,312 B1 * 4/2002 Pearce ................. H04L 7/0029
710/23
6,487,672 B1 11/2002 Byrne et al.
(Continued)

FOREIGN PATENT DOCUMENTS

CN 101488780 B 12/2014
CN 102647374 B 1/2015
(Continued)

OTHER PUBLICATIONS

OA letter of the counterpart TW application (appl. No. 108145918) dated Sep. 9, 2020. Summary of the OA letter Claims 1-5, 9-10 are rejected as being unpatentable over the cited reference 1 (CN 102647374 B) and the cited reference 2 (CN 101488780 B).

*Primary Examiner* — Jean B Corrielus
(74) *Attorney, Agent, or Firm* — WPAT, PC

(57) ABSTRACT

Disclosed is an interference canceller capable of generating a cancellation signal for reducing cross port alien near-end (XPAN) crosstalk of a reception signal received by a receiver of a network device. The interference canceller includes: an oversampling circuit oversampling an XPAN transmission signal originated from a transmitter of the network device and thereby generating an oversampled signal having a frequency higher than the frequency of the receiver's clock; a clock difference calculating circuit calculating a clock difference between the transmitter's clock and the receiver's clock; a sample rate converter processing the oversampled signal according to the clock difference and thereby generating a conversion signal having a frequency lower than the frequency of the oversampled signal and equal to the frequency of the receiver's clock; and a cancelling circuit generating the cancellation signal according to the conversion signal and determining coefficients of the cancelling circuit according to an error signal.

13 Claims, 12 Drawing Sheets

(56) References Cited

U.S. PATENT DOCUMENTS

| | | | |
|---|---|---|---|
| 6,584,162 B1 * | 6/2003 | Tinker | H03H 17/0671 |
| | | | 370/545 |
| 6,687,292 B1 * | 2/2004 | Garcia | H04L 7/0058 |
| | | | 375/231 |
| 8,867,650 B2 | 10/2014 | Huang et al. | |
| 9,231,562 B2 * | 1/2016 | Tinker | H03H 17/0248 |
| 9,252,994 B2 | 2/2016 | Huang et al. | |
| 9,373,318 B1 * | 6/2016 | Piersol | G10L 21/0264 |
| 2002/0012324 A1 * | 1/2002 | Hayward | H04B 3/23 |
| | | | 370/286 |
| 2002/0097794 A1 * | 7/2002 | Smith | H04L 12/66 |
| | | | 375/222 |
| 2007/0047121 A1 | 3/2007 | Eleftheriou et al. | |
| 2010/0091922 A1 * | 4/2010 | Magrath | H03H 17/0628 |
| | | | 375/355 |
| 2011/0249519 A1 * | 10/2011 | Tamura | H04L 7/033 |
| | | | 365/189.15 |
| 2012/0246210 A1 * | 9/2012 | Pan | H03H 17/0628 |
| | | | 708/313 |

FOREIGN PATENT DOCUMENTS

| | | |
|---|---|---|
| TW | I351204 | 10/2011 |
| TW | I462493 | 11/2014 |

\* cited by examiner

INTERFERENCE CANCELLER AND METHOD FOR CANCELLING INTERFERENCE

BACKGROUND OF THE INVENTION

1. Field of the Invention

The present disclosure relates to an interference canceller and interference cancelling method, especially to an interference canceller and interference cancelling method for a network device.

2. Description of Related Art

The transmission signal from a transmitter of a network device can interfere with the reception signal of a receiver of the same network device. However, conventional methods rely on a cancellation signal generation circuit (e.g., a circuit using a least mean square (LMS) technique) of a network device to track and compensate aliasing of an interference signal and a phase shift between a cancellation signal and the interference signal within a certain period of time, and thus the cancellation signal generation circuit may have worse performance due to a timing difference between a transmitter and a receiver of the network device reaching a certain level. Furthermore, during the network device entering a quiet state of a low power idle mode of Energy-Efficient Ethernet (EEE), the cancellation signal generation circuit may be incapable of tracking variations in the phase shift, and this leads to the cancellation signal generation circuit being incapable of generating a suitable cancellation signal at the moment that the network device is leaving the quiet state and thus causing a signal-to-noise ratio of the receiver to deteriorate.

SUMMARY OF THE INVENTION

An object of the present disclosure is to provide an interference canceller and a method for cancelling interference that can tackling an interference problem caused by a transmission signal.

An embodiment of the interference canceller is operable to generate a cancellation signal for reducing cross port alien near-end (XPAN) crosstalk of a reception signal received by a receiver of a network device. This embodiment includes an oversampling circuit, a clock difference calculating circuit, a sample rate converter, and a cancelling circuit. The oversampling circuit is configured to oversample an XPAN transmission signal originated from a transmitter of the network device and thereby generate an oversampled signal having a frequency higher than a frequency of a reception clock of the receiver. The clock difference calculating circuit is configured to calculate a clock difference between a transmission clock of the transmitter and the reception clock of the receiver. The sample rate converter is configured to process the oversampled signal according to the clock difference and thereby generate a conversion signal having a frequency lower than the frequency of the oversampled signal and equal to the frequency of the reception clock of the receiver. The cancelling circuit is configured to generate the cancellation signal according to the conversion signal and to determine at least one coefficient of the cancelling circuit according to an error signal dependent on a difference between the XPAN crosstalk of the reception signal and the cancellation signal.

An embodiment of the method for cancelling interference is performed by a network device. This embodiment can generate a cancellation signal for reducing cross port alien near-end (XPAN) crosstalk of a reception signal received by a receiver of the network device, and includes the following steps: oversampling an XPAN transmission signal originated from a transmitter of the network device and thereby generating an oversampled signal having a frequency higher than a frequency of a reception clock of the receiver; calculating a clock difference between a transmission clock of the transmitter and the reception clock of the receiver; processing the oversampled signal according to the clock difference and thereby generating a conversion signal having a frequency lower than the frequency of the oversampled signal and equal to the frequency of the reception clock; and using a filter to generate the cancellation signal according to the conversion signal and to determine at least one coefficient of the filter according to an error signal dependent on a difference between the XPAN crosstalk of the reception signal and the cancellation signal.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present disclosure includes an interference canceller and a method for cancelling interference. The interference canceller and the method can be applied to a network device including a transmitter and a receiver, and can achieve good performance of interference cancellation when a timing difference between the transmitter and the receiver is serious. In addition, the interference canceller and the method can track the variation in a relation between an interference signal and a cancellation signal during the quiet state of the low power idle mode of Energy-Efficient Ethernet (EEE) to ensure that the performance of interference cancellation remains good at the moment the network device leaving the quiet state of the low power idle mode.

Figure 1:
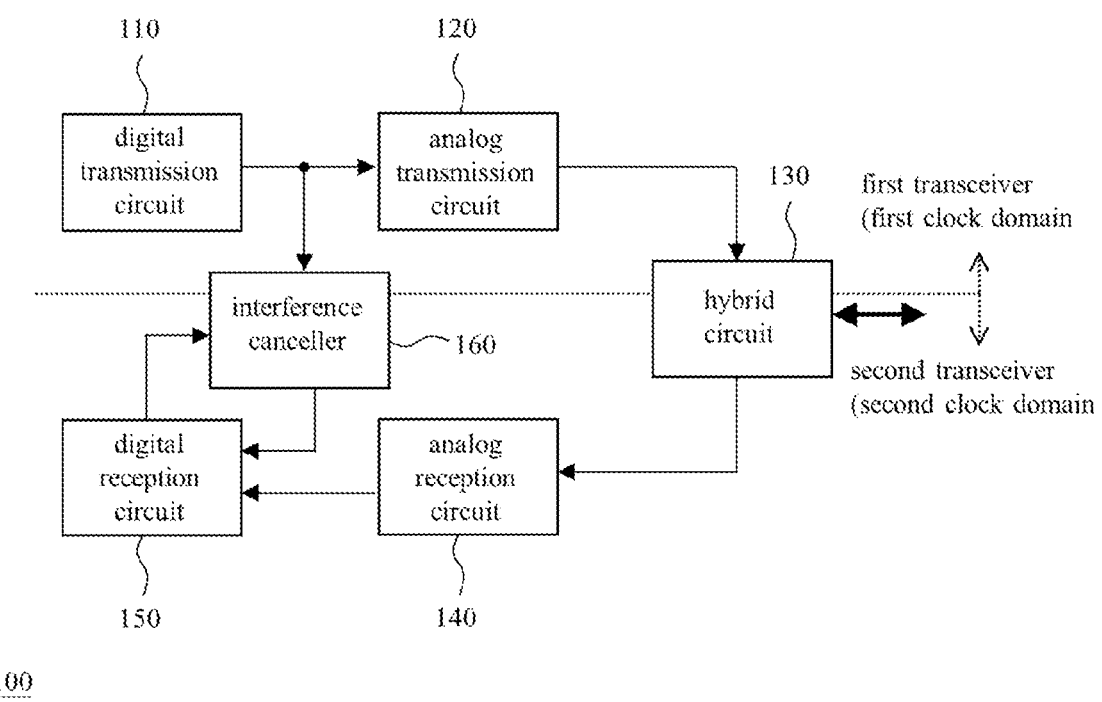
FIG. 1 shows a network device including an interference canceller according to an embodiment of the present disclosure.

FIG. 1 shows a network device including the interference canceller of the present disclosure. The network device 100 is an example for understanding, and includes a digital transmission circuit 110, an analog transmission circuit 120 including a digital-to-analog converter (not shown), a hybrid circuit 130, an analog reception circuit 140 including an analog-to-digital converter (not shown), a digital reception circuit 150, and an interference canceller 160. Both the digital transmission circuit 110 and the analog transmission circuit 120 are included in a transmitter, which operates in a first clock domain, of a first transceiver; both the analog reception circuit 140 and the digital reception circuit 150 are included in a receiver, which operates in a second clock domain, of a second receiver; and the first transceiver and the second transceiver are different transceivers, and the first clock domain is different from the second clock domain. The interference canceller 160 outputs a cancellation signal to the digital reception circuit 150 according to an output signal of the digital transmission circuit 110 and a feedback signal of the digital reception circuit 150 so that the digital reception circuit 150 can eliminate an interference component of a reception signal from the analog reception circuit 140 according to the cancellation signal.

Figure 2:
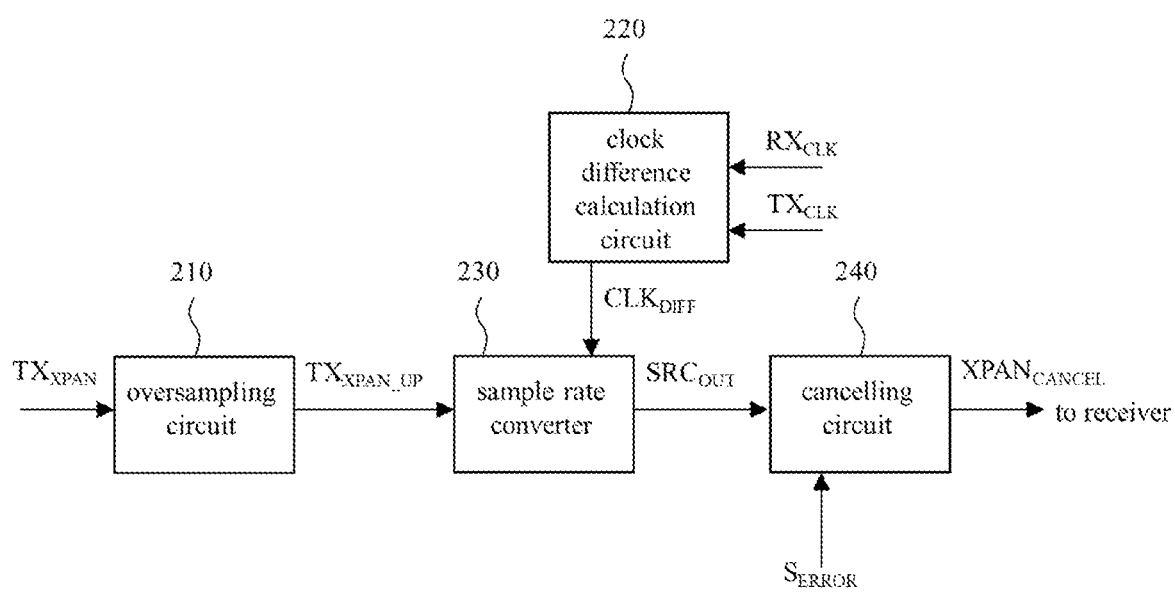
FIG. 2 shows an embodiment of the interference canceller of the present disclosure.
Figure 6:
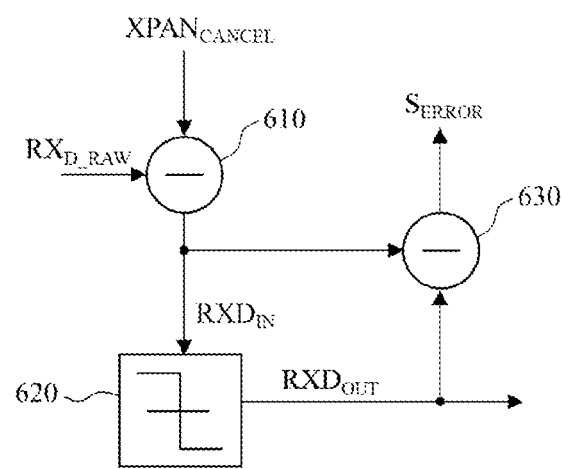
FIG. 6 shows an embodiment of the receiver mentioned in FIG. 2.

FIG. 2 shows an embodiment of the interference canceller of the present disclosure. The interference canceller 200 of FIG. 2 is operable to generate a cancellation signal for reducing cross port alien near-end (XPAN) crosstalk of a reception signal (e.g., the output from the analog reception circuit 140 of FIG. 1) received by a receiver of a network device. The interference canceller 200 includes an oversampling circuit 210, a clock difference calculating circuit 220, a sample rate converter 230, and a cancelling circuit 240, wherein the oversampling circuit 210, the clock difference calculating circuit 220, and the sample rate converter 230 as a whole can be deemed a symbol rate converter. The oversampling circuit 210 is configured to oversample an XPAN transmission signal ($TX_{XPAN}$) (e.g., the output from the digital transmission circuit 110 of FIG. 1) originated from a transmitter of the network device and thereby generate an oversampled signal ($TX_{XPAN\_UP}$). The oversampled signal has a frequency higher than a frequency of a reception clock ($RX_{CLK}$) of the receiver; and this feature makes the output ($SRC_{OUT}$) of the sample rate converter 230 include aliasing so that the cancelling circuit 240 can generate aliasing similar to the aliasing of the reception signal for interference cancellation. The clock difference calculating circuit 220 is configured to calculate a clock difference ($CLK_{DIFF}$) between a transmission clock ($TX_{CLK}$) of the transmitter and the reception clock of the receiver. The sample rate converter 230 is configured to process the oversampled signal according to the clock difference and thereby generate a conversion signal ($SRC_{OUT}$). The conversion signal has a frequency lower than the frequency of the oversampled signal and equal to the frequency of the reception clock of the receiver in order to eliminate/reduce the phase shift between the XPAN transmission signal and the reception signal. The cancelling circuit 240 is configured to generate the cancellation signal ($XPAN_{CANCEL}$) according to the conversion signal, and to determine at least one coefficient of the cancelling circuit 240 according to an error signal ($S_{ERROR}$) and thereby try to reduce the error which the next error signal will indicate, wherein the error signal is dependent upon the difference between the XPAN crosstalk of the reception signal and the cancellation signal as shown in FIG. 6.

Please refer to FIG. 2. The oversampling circuit 210 of FIG. 2 can use a known technique (e.g., a zero-order hold technique or a raised cosine technique) or a self-developed technique to oversample the XPAN transmission signal; for example, a zero-order hold technique can duplicate an input signal (e.g., a signal having input values "AB") and generate an output signal (e.g., a signal having output values "AABB") to realize an oversampling operation. In an exemplary implementation, the network device (e.g., the network device 100 of FIG. 1) adopting the interference canceller of the present disclosure is an Ethernet network device conforming to the 2.5G BASE-T standard; a receiver of the network device receives reception signals via a connection terminal (e.g., a connection port) of the Ethernet network device; a transmitter of the network device transmits transmission signals via another connection terminal (e.g., a connection port) of the Ethernet network device, and the transmission signals interfere with the reception signals; the reception rate of the receiver is 2.5 Gbit/s, and the transmission rate of the transmitter is also 2.5 Gbit/s; the reception clock of the receiver is 200 MHz (i.e., symbol rate, also known as baud), the transmission clock of the transmitter is 200 MHz plus a bias (i.e., symbol rate, also known as baud), and the oversampling circuit 210 generates the oversampled signal according to a clock twice as fast as the transmission clock so that the frequency of the oversampled signal is the double of the frequency of the transmission clock and is higher than the frequency of the reception clock. In another exemplary implementation, the reception rate of the receiver is 2.5 Gbit/s and the transmission rate of the transmitter is 1 Gbit/s; the reception clock is 200 MHz, the transmission clock is 125 MHz plus a bias, and the oversampling circuit 210 generates the oversampled signal according to a clock twice as fast as the transmission clock so that the frequency of the oversampled signal is the double of the frequency of the transmission clock and is higher than the frequency of the reception clock. The configuration of the oversampling circuit 210 and other exemplary implementations can be derived from the above description in view of the demand for implementation.

Please refer to FIG. 2. The clock difference calculating circuit 220 of FIG. 2 can be realized with a known or self-developed technique. In an exemplary implementation, the clock difference calculating circuit 220 compares a first number of the reception clock ($RX_{CLK}$) within a period of time with a second number of the transmission clock ($TX_{CLK}$) within the same period of time, and thereby obtains a ratio of the first number to the second number indicative of the clock difference. For example, provided the frequency of the reception clock is 200 MHz and the frequency of the transmission clock is 200 MHz plus a bias, the clock difference calculating circuit 220 can calculate "x" of the ratio $$"\frac{1}{1+x}",$$

that is equivalent to the ratio of "200 MHz" to "200 MHz+bias", to indicate the clock difference. For another example, provided the frequency of the reception clock is 200 MHz and the frequency of the transmission clock is 125 MHz plus a bias, the clock difference calculating circuit 220 can calculate "y" of the ratio $$"\frac{8}{5+y}",$$

that is equivalent to the ratio of "200 MHz" to "125 MHz+bias" to indicate the clock difference. The implementation of the clock difference calculating circuit 220 and other examples of the calculation of the clock difference can be derived from the above description in view of the demand for implementation.

Figure 3:
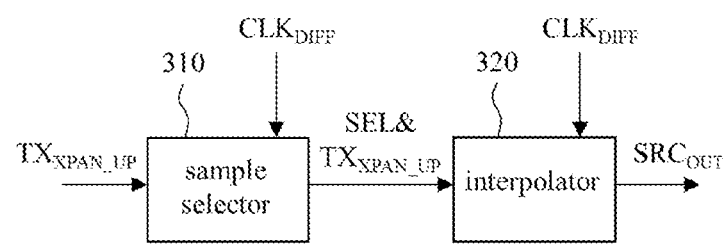
FIG. 3 shows an embodiment of the sample rate converter of FIG. 2.

FIG. 3 shows an embodiment of the sample rate converter 230 of FIG. 2. The sample rate converter 230 of FIG. 3 includes a sample selector 310 and an interpolator 320. The sample selector 310 is configured to selecting K output value(s) of the oversampled signal according to the clock difference and thereby generate a selection result (SEL), wherein the K is a positive integer. The interpolator 320 is configured to receive the selection result and perform interpolation according to the clock difference and the oversampled signal so as to generate K output value(s) of the conversion signal corresponding to the K output values of the oversampled signal. It should be noted that the frequency of the conversion signal is equal to the frequency of the reception clock for realizing the symbol rate conversion from the transmission rate to the reception rate.

Figure 4:
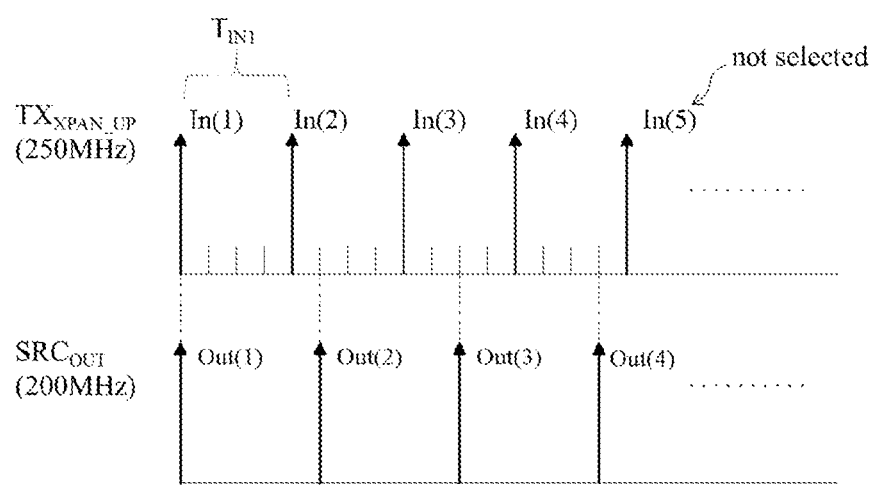
FIG. 4 shows an example of the signal correspondence relation between the oversampled signal and the conversion signal of FIG. 3.

Please refer to FIG. 3. In an exemplary implementation, the frequency of the transmission clock is 125 MHz, the frequency of the oversampled signal is 250 MHz, the frequency of the reception clock is 200 MHz. In this exemplary implementation, the ratio of a quantity of output values of the oversampled signal within a period of time to a quantity of output values of the conversion signal within the same period of time is 1.25

$$\left(\text{i.e., } \frac{250 \text{ MHz}}{200 \text{ MHz}}\right)$$

that is dependent on the clock difference. Accordingly, the time for the sample rate converter 230 receiving five output values of the oversampled signal should be equal to the time for the sample rate converter 230 outputting four output values of the conversion signal. In light of the above, as shown in FIGS. 3-4 the sample selector 310 can select the first four output values (In(1), In(2), In(3), In(4)) among the successive five output values (In(1), In(2), In(3), In(4), IN(5)) of the oversampled signal (i.e., the aforementioned K output values of the oversampled signal) in accordance with the clock difference, and thereby generate the selection result without the fifth output value (In(5)); the interpolator 320 receives all output values of the oversampled signal and the selection result and thereby performs interpolation according to the clock difference and the oversampled signal so as to generate four output values (Out(1), Out(2), Out(3), Out(4)) of the conversion signal corresponding to the four output values (In(1), In(2), In(3), In(4)) of the oversampled signal. More specifically, as shown in FIG. 4 the time interval between every two adjacent output values of the oversampled signal is $T_{IN1}$, the timing of Out(1) is aligned with the timing of In(1), and the interpolator 320 can learn that the timing difference between Out(2) and In(2) is 0.25$T_{IN1}$, the timing difference between Out(3) and In(3) is 0.5$T_{IN1}$, and the timing difference between Out(4) and In(4) is 0.75$T_{IN1}$ according to the clock difference; therefore, the interpolator 320 can use the above-mentioned timing relation and a known or self-developed interpolation algorithm to choose suitable output values of the oversampled signal and thereby generate the four output values (Out(1), Out(2), Out(3), Out(4)) of the conversion signal. The other selection and interpolation procedures of the sample rate converter 230 can be derived from the above description. It should be noted that in order to simplify calculation, the interpolator 320 may merely receive/use some output values of the oversampled signal and perform interpolation according to the clock difference and the received/used output values.

Figure 5:
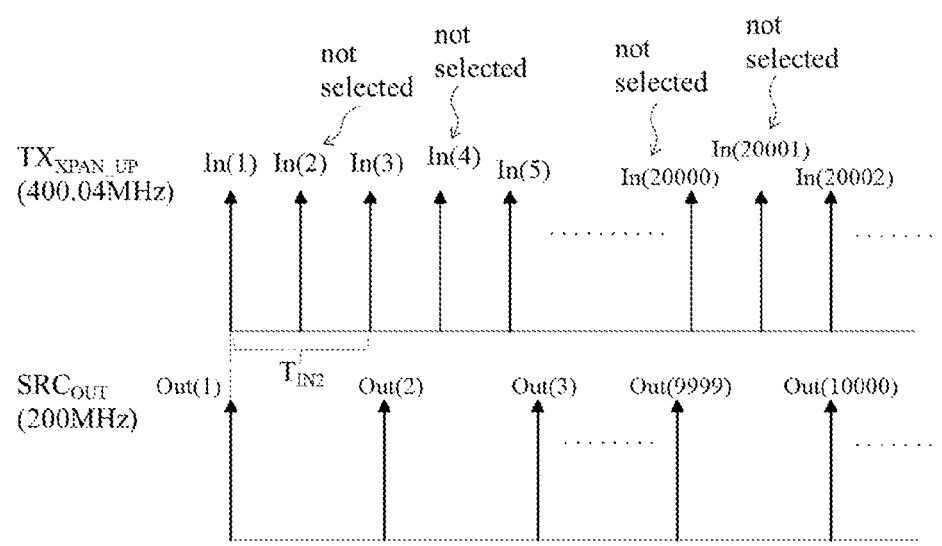
FIG. 5 shows another example of the signal correspondence relation between the oversampled signal and the conversion signal of FIG. 3.

Please refer to FIG. 3. In an exemplary implementation, the frequency of the transmission clock is 200.02 MHz, the frequency of the oversampled signal is 400.04 MHz, the frequency of the reception clock is 200 MHz. In this exemplary implementation, the ratio of a quantity of output values of the oversampled signal within a period of time to a quantity of output values of the conversion signal within the same period of time is 2.0002

$$\left(\text{i.e., } \frac{2 \times 200.02 \text{ MHz}}{200 \text{ MHz}}\right)$$

that is indicative of the double of the clock difference. Accordingly, the time for the sample rate converter 230 receiving 20002 output values of the oversampled signal should be equal to the time for the sample rate converter 230 outputting 10000 output values of the conversion signal ideally. In light of the above, as shown in FIGS. 3 and 5 the sample selector 310 can select 10000 output values (e.g., selecting In(1), In(3), In(5), In(19996), In(19998), and In(20002) and skipping In(2), In(4), In(6), In(19999), In(20000), and In(20001)) among the 20002 output values of the oversampled signal (i.e., the aforementioned K output values of the oversampled signal) according to the clock difference, and thereby generate the selection result; the interpolator 320 receives all output values of the oversampled signal and the selection result and thereby performs interpolation according to the clock difference and the oversampled signal so as to generate 10000 output values (Out(1), Out(2), Out(9999), Out(10000)) of the conversion signal that are corresponding to the 10000 output values (In(1), In(3), In(5), In(19996), In(19998), and In(20002)) of the oversampled signal. More specifically, as shown in FIG. 5 the time interval between every two adjacent odd/even output values of the oversampled signal is $T_{IN2}$, the timing of Out(1) is aligned with the timing of In(1), and the interpolator 320 can find out that the timing difference between Out(2) and In(3) is 0.0002$T_{IN2}$, the timing difference between Out(3) and In(5) is 0.0004$T_{IN2}$, and so on and so forth according to the clock difference; therefore, the interpolator 320 can use the above-mentioned timing relation and a known or self-developed interpolation algorithm to generate the 10000 output values (Out(1), Out(2), Out (9999), Out(10000)) of the conversion signal. It should be noted that the selection of the output values of the oversampled signal may be related to the accumulation of timing difference and the cycle of signal correspondence, and this explains why the output values " . . . In(19996), In(19998), and In(20002)" instead of " . . . In(19997), In(19999), and In(20002)" are selected.

Please refer to FIGS. 1-3. In an exemplary implementation, the receiver in the network device (e.g., the network device 100 of FIG. 1) including the interference canceller 200 enters the quiet state of the low power idle mode of Energy-Efficient Ethernet (EEE); when the receiver leaves the quiet state (e.g., the network device enters a refresh state or an idle state from the quiet state), the sample rate converter 230 can refer to the clock difference, a duration of the quiet state of the low power idle mode, and a signal correspondence relation between the conversion signal and the oversampled signal at the moment the receiver enters the quiet state (e.g., before the entrance to the quiet state, the sample rate converter 230 outputs an output value Out(5000) of the conversion signal corresponding to an output value In(10000) of the oversampled signal) to recover the current signal correspondence relation and generate the conversion signal. To be more specific, the sample rate converter 230 can refer to the clock difference, the duration of the quiet state, and the output value at the moment the receiver enters the quiet state to estimate which of the output values of the conversion signal should be outputted, and thereby generate the conversion signal. Since the states of the low power idle mode recited in the specification of EEE is known in this technique field, their detail is omitted here.

Please refer to FIG. 2. In an exemplary implementation, the cancelling circuit 240 is a least mean square (LMS) filter or a recursive least square (RLS) filter. The cancelling circuit 240 can adjust one or more coefficients of the cancelling circuit 240 according to the variation in the error signal, and thereby reduce the error which the next error signal will indicate. The smaller the error, the better the result of interference cancellation. In an exemplary implementation, the cancelling circuit 240 is included in the aforementioned network device; and the earlier the cancelling circuit 240 receiving the error signal, the better the performance In an exemplary implementation, it is preferred to have more setting values of the step size of the cancelling circuit 240 (e.g., the step size of an LMS filter) for accurately dealing with different interference cancellation conditions.

Please refer to FIGS. 1-2. An embodiment of the receiver mentioned in FIG. 2 is shown in FIG. 6, and includes a first circuit 610, a slicer 620, and a second circuit 630. The first circuit 610 (e.g., adder/subtractor) is configured to generate an input signal ($RXD_{IN}$) according to the difference between the reception signal ($RXD_{\_RAW}$) and the cancellation signal ($XPAN_{CANCEL}$). The slicer 620 is configured to generate a series of signal levels as an output signal ($RXD_{OUT}$) according to the input signal. The second circuit 630 (e.g., adder/subtractor) is configured to output the error signal ($S_{ERROR}$) to the cancelling circuit 240 according to the difference between the input signal and the output signal. In an exemplary implementation, the less the difference between the input signal and the output signal, the less the error which the error signal will indicate. Embodiments of the first circuit 610, the slicer 620, and the second circuit 630 are found in the applicant's U.S. patent with U.S. Pat. No. 9,252,994B2.

Figure 7:
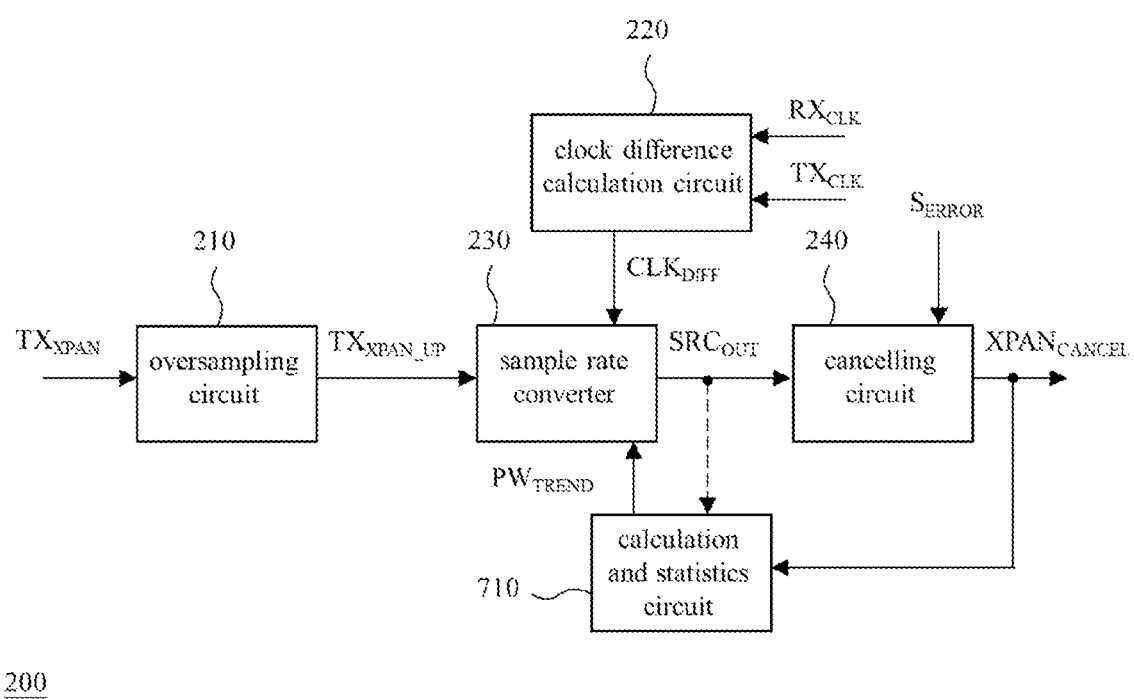
FIG. 7 shows another embodiment of the interference canceller of the present disclosure.
Figure 8A:
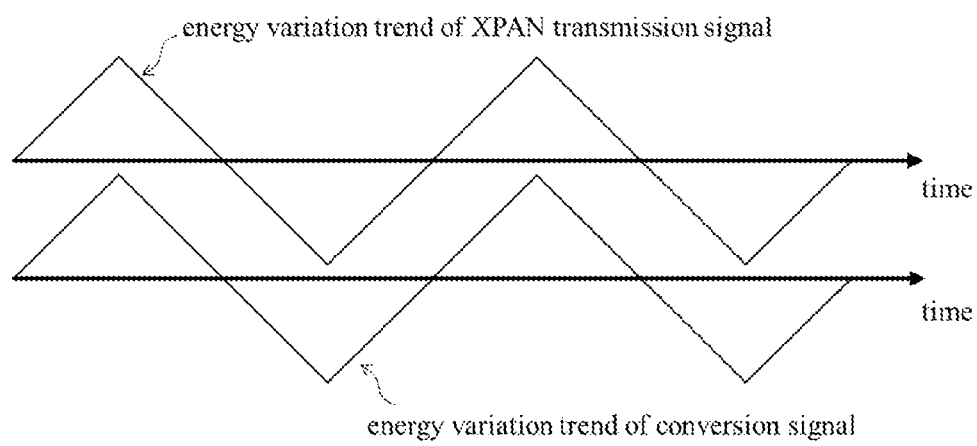
FIG. 8a shows an example of the energy variation trends of the conversion signal and the XPAN transmission signal of FIG. 7.
Figure 8B:
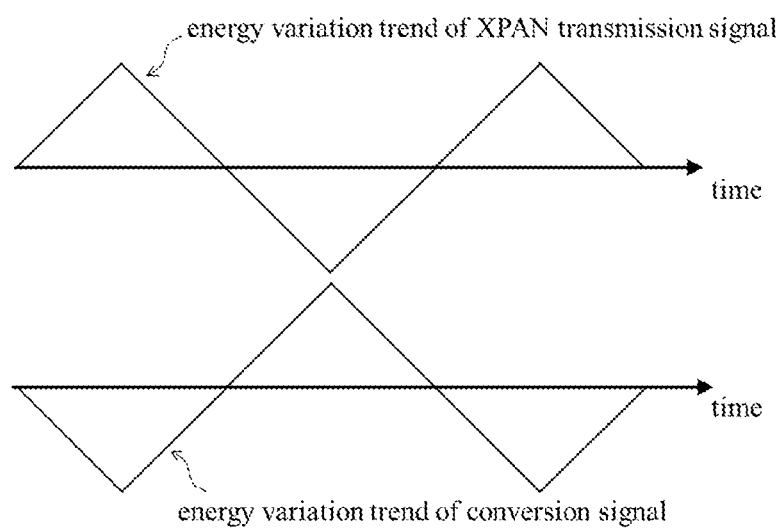
FIG. 8b shows another example of the energy variation trends of the conversion signal and the XPAN transmission signal of FIG. 7.

FIG. 7 shows another embodiment of the interference canceller of the present disclosure. Compared with the interference canceller 200 of FIG. 2, the interference canceller 700 of FIG. 7 further includes a calculation and statistics circuit 710; it should be noted that the path between the sample rate converter 230 and the calculation and statistics circuit 710 in FIG. 7 is optional in accordance with the demand for implementation. The calculation and statistics circuit 710 is coupled to the sample rate converter 230 and the cancelling circuit 240, and configured to assist in making the energy variation trend of the conversion signal be identical/similar to the energy variation trend of the XPAN transmission signal as shown in FIG. 8*a* so that the workload of the cancelling circuit 240 can be reduced. In other words, if the energy variation trend of the conversion signal is different from the energy variation trend of the XPAN transmission signal as shown in FIG. 8*b*, which means that the variation in the conversion signal is not synchronous with the variation in the XPAN transmission signal, the cancelling circuit 240 has to spend more time and calculation resource to adjust the coefficient(s) of the cancelling circuit 240, and take more efforts to generate a suitable cancellation signal for cancelling the interference component of the XPAN transmission signal according to the conversion signal.

Figure 9:
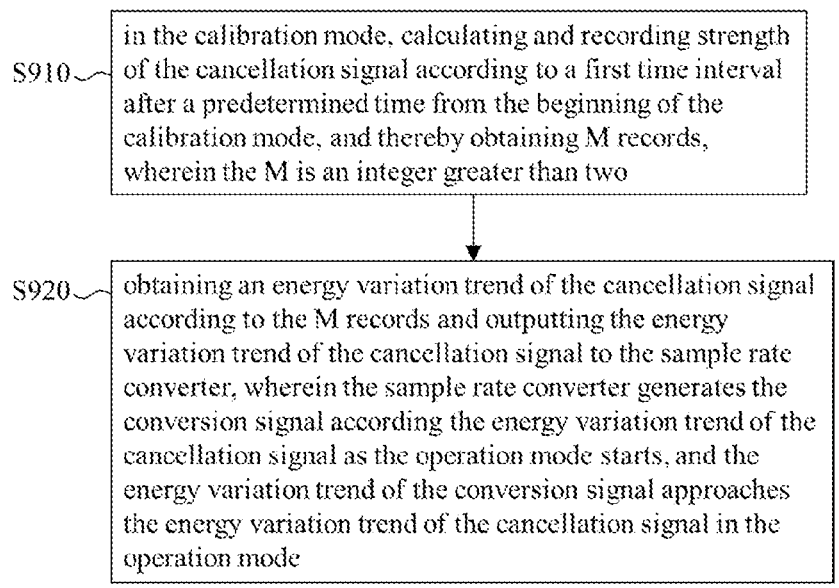
FIG. 9 shows an exemplary implementation of the steps performed by the calculation and statistics circuit of FIG. 7.

Please refer to FIG. 7. In an exemplary implementation, the clock difference is composed of a main difference and a bias; for example, if the frequency of the transmission clock is 200.02 MHz and the frequency of the reception clock is 200 MHz, the main difference is indicative of the difference between the integral parts of the two frequencies (i.e., |200 MHz-200 MHz|=0), and the bias is indicative of the difference between the decimal parts of the two frequencies (i.e., |0.02 MHz-0 MHz|=0.02 MHz). In this exemplary implementation, the sample rate converter 230 is configured to process the oversampled signal according to the main difference and the bias in an operation mode and thereby generate the conversion signal (e.g., FIG. 5), and the frequency of the conversion signal is equal to the frequency of the reception clock in the operation mode. Furthermore, the sample rate converter 230 is optionally configured to process the oversampled signal according to the main difference without referring to the bias in a calibration mode, and thereby generate the conversion signal (e.g., simply outputting the odd/even output values of the oversampled signal as the output values of the conversion signal in an alternative embodiment based on FIG. 5), so that the cancelling circuit 240 can promptly use the conversion signal to output a cancellation signal having an energy variation trend approaching to the energy variation trend of the XPAN transmission signal, wherein the frequency of the conversion signal is also equal to the frequency of the reception clock in the calibration mode. In the above exemplary implementation, the calculation and statistics circuit 710 is used for performing the steps of FIG. 9 as follows:

S910: in the calibration mode, calculating and recording strength of the cancellation signal according to a first time interval after a predetermined time from the beginning of the calibration mode, and thereby obtaining M records, wherein the M is an integer greater than two. During the predetermined time, the variation in the cancellation signal will converge as the cancelling circuit 240 continually adjusts the coefficient(s) of the cancelling circuit 240 according to the aforementioned error signal, which means that the energy variation trend of the cancellation signal will become close to the energy variation trend of the XPAN transmission signal. For example, provided the frequency of the transmission clock is 200.02 MHz and the frequency of the reception clock is 200 MHz, the time length of outputting 10001 output value of the XPAN transmission signal should be equal to the time length of outputting 10000 output value of the cancellation signal; accordingly, the calculation and statistics circuit 710 can treat the time length of outputting 500 output values as the first time interval, then calculate and record the strength of the cancellation signal according to the first time interval, and obtain at least twenty records (i.e., 10000/

500) as the samples of at least 10000 output values of the cancellation signal that are corresponding to 10001 output values of the XPAN transmission signal, wherein the twenty records includes a maximum value. It should be noted that the way to calculate signal strength is known in this technical field, and the detail is omitted here.

S920: obtaining an energy variation trend of the cancellation signal according to the M records and outputting the energy variation trend ($PW_{TREND}$) (i.e., the result of calculation and statistics) of the cancellation signal to the sample rate converter 230, wherein the sample rate converter 230 generates the conversion signal according the energy variation trend of the cancellation signal as the operation mode starts, and the energy variation trend of the conversion signal is supposed to approach the energy variation trend of the cancellation signal (i.e., the energy variation trend of the XPAN transmission signal) in the operation mode. For example, provided the frequency of the transmission clock is 200.02 MHz and the frequency of the reception clock is 200 MHz, the calculation and statistics circuit 710 provides 20 records indicative of a time length being equal/proportional to a cycle of the energy variation trend of the cancellation signal; the sample rate converter 230 finds out that the 6th record among the 20 records has the maximum value according to the output of the calculation and statistics circuit 710; afterwards, at a time point that the energy of the cancellation signal is believed to reach the peak, the sample rate converter 230 uses the oversampled signal to perform interpolation according to the clock difference (i.e., the major difference and bias) and the position (i.e., 6/20=0.3) of the peak in the cycle of the energy variation trend, and thereby generates the maximum value (e.g., the $3000^{th}$ (10000×0.3) output value "Out(3000)" that can be derived from FIG. 5) of the conversion signal so as to make the energy variation trend of the conversion signal be identical/similar to the energy variation trend of the XPAN transmission signal and ensure the performance of the cancelling circuit 240.

Figure 10:
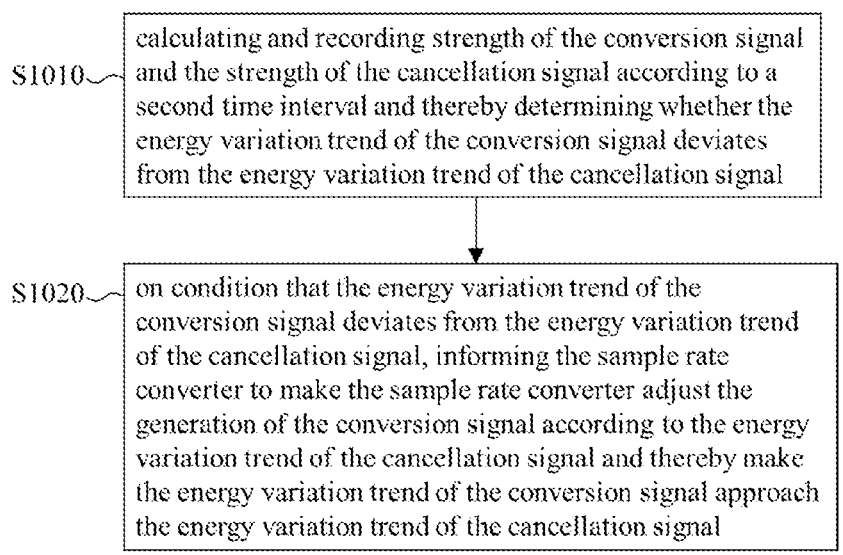
FIG. 10 shows another exemplary implementation of the steps performed by the calculation and statistics circuit of FIG. 7.

Please refer to FIG. 7. In another exemplary implementation, the calculation and statistics circuit 710 is configured to perform the steps of FIG. 10 in the operation mode. The steps of FIG. 10 are as follows:

S1010: calculating and recording strength of the conversion signal and the strength of the cancellation signal according to a second time interval and thereby determining whether the energy variation trend of the conversion signal deviates from the energy variation trend of the cancellation signal. The second time interval can be the same as or different from the aforementioned first time interval, and the way to calculate and record signal strength can be inferred from the description of the embodiment of FIG. 9.

S1020: on condition that the energy variation trend of the conversion signal deviates from the energy variation trend of the cancellation signal, informing the sample rate converter 230 to make the sample rate converter 230 adjust the generation of the conversion signal according to the energy variation trend of the cancellation signal and thereby make the energy variation trend of the conversion signal approach the energy variation trend of the cancellation signal. The way to adjust the generation of the conversion signal can be inferred from the description of the embodiment of FIG. 9.

Figure 11:
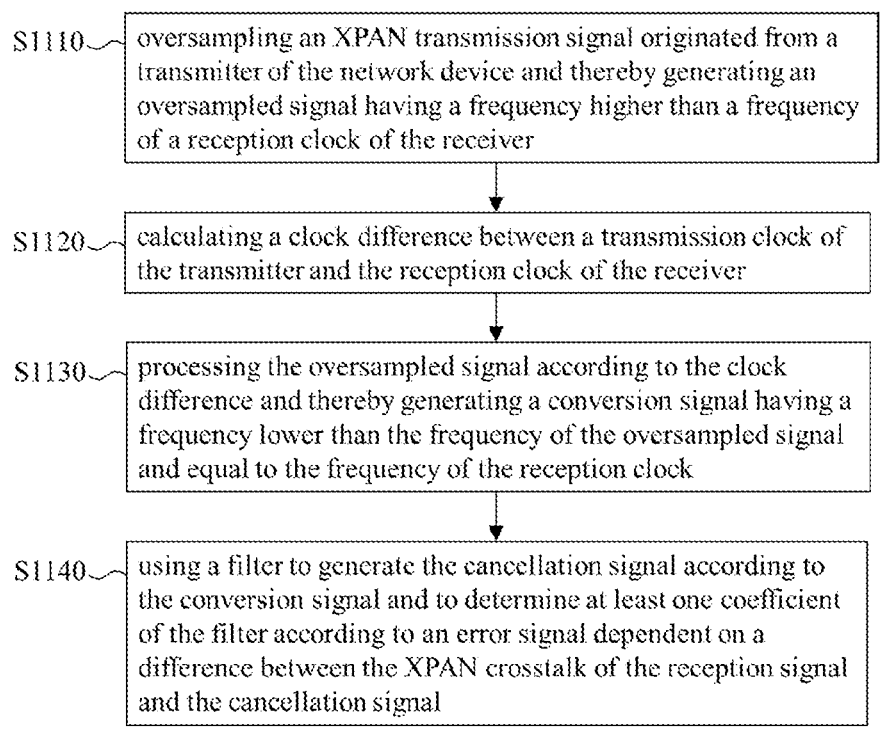
FIG. 11 shows a method for cancelling interference according to an embodiment of the present disclosure.

FIG. 11 shows an embodiment of the method for cancelling interference of the present disclosure. This embodiment is performed by a network device (e.g., the network device 100 of FIG. 1), and can generate a cancellation signal for reducing cross port alien near-end (XPAN) crosstalk of a reception signal received by a receiver of the network device. The embodiment includes the following steps:

S1110: oversampling an XPAN transmission signal originated from a transmitter of the network device and thereby generating an oversampled signal having a frequency higher than a frequency of a reception clock of the receiver. This step can be performed by the oversampling circuit 210 of FIG. 2/7.

S1120: calculating a clock difference between a transmission clock of the transmitter and the reception clock of the receiver. This step can be performed by the clock difference calculating circuit 200 of FIG. 2/7.

S1130: processing the oversampled signal according to the clock difference and thereby generating a conversion signal having a frequency lower than the frequency of the oversampled signal and equal to the frequency of the reception clock. This step can be performed by the sample rate converter 230 of FIG. 2/7.

S1140: using a filter to generate the cancellation signal according to the conversion signal and to determine at least one coefficient of the filter according to an error signal dependent on a difference between the XPAN crosstalk of the reception signal and the cancellation signal. An embodiment of the filter is the cancelling circuit 240 of FIG. 2/7.

Since those of ordinary skill in the art can appreciate the detail and modification of the method embodiment by referring to the disclosure of the device embodiments, which implies that some or all of the features of the device embodiments can be applied to the method embodiment in a logical way, repeated and redundant description is omitted here.

It should be noted that people of ordinary skill in the art can selectively use some or all of the features of any embodiment in this specification or selectively use some or all of the features of multiple embodiments in this specification to implement the present invention as long as such implementation is practicable, which implies that the present invention can be carried out flexibly. It should also be noted that the sentence "A is equal to B" in this specification is based on the aspect of engineering, and thus the interpretation of this sentence includes "A=B" and "A≈B"; in addition, the sentence "A approaches B" can be interpreted as the difference between A and B being less than a predetermined threshold.

To sum up, the interference canceller and the method of the present disclosure make the cancellation signal include aliasing and phase shift similar to the to-be-cancelled component of the reception signal and thereby achieve better performance of interference cancellation in comparison with the prior art especially when the timing difference between the transmitter's clock domain and the receiver's clock domain is serious. In addition, the interference canceller and the method of the present disclosure can track the variation in the relation between the interference signal and the cancellation signal during the low power idle mode of EEE.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A circuit comprising:
an oversampling circuit configured to oversample a transmission signal originated from a transmitter of a network device and thereby generate an oversampled signal having a frequency higher than a frequency of a reception clock of a receiver of the network device;
a clock difference calculating circuit configured to calculate a clock difference between a transmission clock of the transmitter and the reception clock of the receiver;
a sample rate converter configured to process the oversampled signal according to the clock difference and thereby generate a conversion signal having a frequency lower than the frequency of the oversampled signal and equal to the frequency of the reception clock of the receiver; and
a cancelling circuit configured to generate a cancellation signal according to the conversion signal and to determine at least one coefficient of the cancelling circuit according to an error signal dependent on a difference between a crosstalk value of a reception signal received by the receiver and the cancellation signal.

2. The circuit of claim 1, wherein the transmission signal originated from the transmitter of the network device is a cross port alien near-end (XPAN) crosstalk transmission signal, and the crosstalk cancelling circuit is an XPAN cancelling circuit.

3. The circuit of claim 2, wherein the oversampling circuit generates the oversampled signal with a zero-order hold technique or a raised cosine technique.

4. The circuit of claim 1, wherein the sample rate converter includes:
a sample selector configured to selecting K output value(s) of the oversampled signal according to the clock difference, in which the K is a positive integer; and
an interpolator configured to perform interpolation according to the clock difference and the oversampled signal and thereby generate K output value(s) of the conversion signal corresponding to the K output values of the oversampled signal.

5. The circuit of claim 1, wherein the cancelling circuit is a least mean square (LMS) filter or a recursive least square (RLS) filter.

6. The circuit of claim 1, wherein the receiver includes following circuits for providing the error signal:
a first circuit configured to generate an input signal according to the difference between the reception signal and the cancellation signal;
a slicer configured to generate an output signal according to the input signal; and
a second circuit configured to output the error signal to the cancelling circuit according to the difference between the input signal and the output signal.

7. The circuit of claim 1, wherein the clock difference is composed of a main difference and a bias; the sample rate converter is configured to process the oversampled signal according to the main difference and the bias in an operation mode and thereby generate the conversion signal, and the frequency of the conversion signal is equal to the frequency of the reception clock in the operation mode; the sample rate converter is further configured to process the oversampled signal according to the main difference without referring to the bias in a calibration mode and thereby generate the conversion signal, and the frequency of the conversion signal is equal to the frequency of the reception clock in the calibration mode; and the circuit further comprises:
a calculation and statistics circuit coupled to the sample rate converter and the cancelling circuit and configured to perform a plurality of steps including:
calculating and recording strength of the cancellation signal according to a first time interval in the calibration mode after a predetermined time from a beginning of the calibration mode, and thereby obtaining M records, wherein the M is an integer greater than two; and
obtaining an energy variation trend of the cancellation signal according to the M records and outputting the energy variation trend of the cancellation signal to the sample rate converter, wherein the sample rate converter generates the conversion signal according the energy variation trend of the cancellation signal so that an energy variation trend of the conversion signal approaches the energy variation trend of the cancellation signal in the operation mode.

8. The circuit of claim 7, wherein in the operation mode, the plurality of steps further includes:
calculating and recording strength of the conversion signal and the strength of the cancellation signal according to a second time interval and thereby determining whether the energy variation trend of the conversion signal deviates from the energy variation trend of the cancellation signal; and
on condition that the energy variation trend of the conversion signal deviates from the energy variation trend of the cancellation signal, informing the sample rate converter to make the sample rate converter adjust generation of the conversion signal according to the energy variation trend of the cancellation signal and thereby make the energy variation trend of the conversion signal approach the energy variation trend of the cancellation signal.

9. The circuit of claim 1, further comprising:
a calculation and statistics circuit coupled to the sample rate converter and the cancelling circuit, and configured to perform a plurality of steps including:
calculating and recording strength of the cancellation signal according to a first time interval in the calibration mode after a predetermined time from a beginning of the calibration mode, and thereby obtaining M records, wherein the M is an integer greater than two; and
obtaining an energy variation trend of the cancellation signal according to the M records and outputting the energy variation trend of the cancellation signal to the sample rate converter, wherein the sample rate converter generates the conversion signal according the energy variation trend of the cancellation signal since a beginning of an operation mode so as to make an energy variation trend of the conversion signal approach the energy variation trend of the cancellation signal in the operation mode.

10. The circuit of claim 9, wherein in the operation mode, the plurality of steps further includes:
calculating and recording strength of the conversion signal and the strength of the cancellation signal according to a second time interval and thereby determining whether the energy variation trend of the conversion signal deviates from the energy variation trend of the cancellation signal; and
on condition that the energy variation trend of the conversion signal deviates from the energy variation trend of the cancellation signal, informing the sample rate converter to make the sample rate converter adjust generation of the conversion signal according to the energy variation trend of the cancellation signal and thereby make the energy variation trend of the conversion signal approach the energy variation trend of the cancellation signal.

11. The circuit of claim 1, further comprising:
a calculation and statistics circuit coupled to the sample rate converter and the cancelling circuit and configured to perform a plurality of steps including:
  calculating and recording strength of the conversion signal and strength of the cancellation signal according to a time interval and thereby determining whether an energy variation trend of the conversion signal deviates from an energy variation trend of the cancellation signal; and
  on condition that the energy variation trend of the conversion signal deviates from the energy variation trend of the cancellation signal, informing the sample rate converter to make the sample rate converter adjust generation of the conversion signal according to the energy variation trend of the cancellation signal and thereby make the energy variation trend of the conversion signal approach the energy variation trend of the cancellation signal.

12. The circuit of claim 1, wherein in a circumstance that the receiver enters a low power idle mode of Energy-Efficient Ethernet (EEE), the sample rate converter refers to the clock difference, a duration of a quiet state of the low power idle mode, and a signal correspondence relation between the conversion signal and the oversampled signal at a moment that the receiver enters the quiet state to generate the conversion signal when the receiver leaves the quiet state.

13. An interference cancellation method performed by a network device, the method for generating a cancellation signal for reducing cross port alien near-end (XPAN) crosstalk of a reception signal received by a receiver of the network device, and comprising:
  oversampling an XPAN transmission signal originated from a transmitter of the network device and thereby generating an oversampled signal having a frequency higher than a frequency of a reception clock of the receiver;
  calculating a clock difference between a transmission clock of the transmitter and the reception clock of the receiver;
  processing the oversampled signal according to the clock difference and thereby generating a conversion signal having a frequency lower than the frequency of the oversampled signal and equal to the frequency of the reception clock; and
  using a filter to generate the cancellation signal according to the conversion signal and to determine at least one coefficient of the filter according to an error signal dependent on a difference between the XPAN crosstalk of the reception signal and the cancellation signal.

* * * * *